Figure 1:
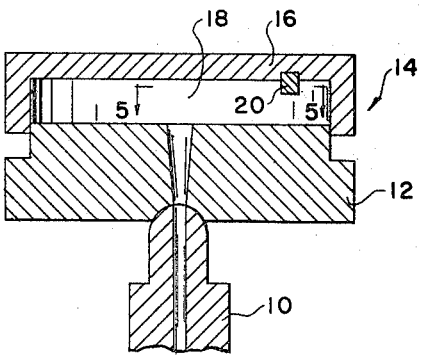
Figure 2:
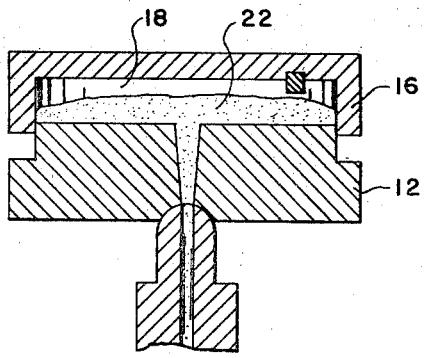
Figure 3:
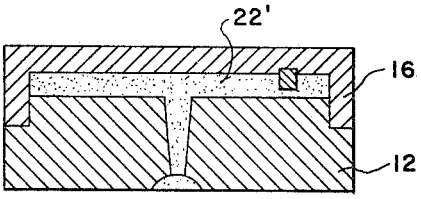
Figure 4:
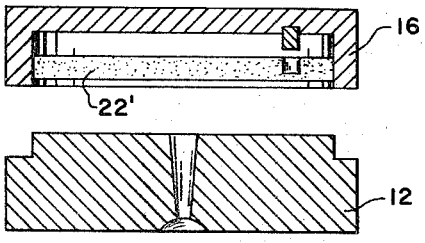
Figure 5:
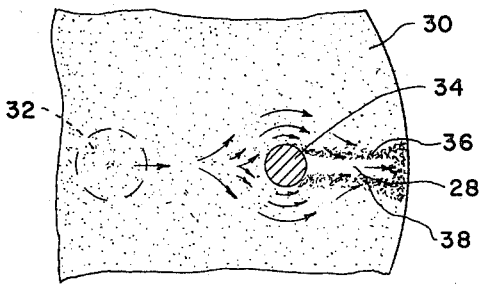
Figure 6:
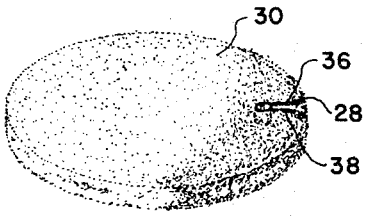
Figure 7:
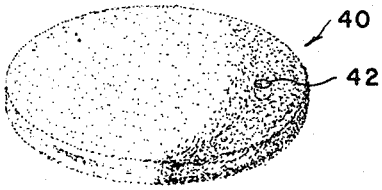

419-36 SR CROSS REFERENCE SEARCH ROOM
XR T 867,022
7X419/36
T 867,02

Oct. 28, 1969 W. L. JOHNSON ET AL DEF. PUB.

METHOD OF MOLDING ARTICLES USING MOLDING COMPOSITIONS CONTAINING DISPERSED PARTICULATE ADDITIVES

Filed May 26, 1969

WILLIAM L. JOHNSON
BEN T. PARDUE
INVENTORS

BY John F. Stevens
ATTORNEY

T867022
OR IN 264/328.7